United States Patent [19]
Hori et al.

[11] Patent Number: 6,009,367
[45] Date of Patent: Dec. 28, 1999

[54] AUTOMATIC CONSTANT-SPEED CRUISING CONTROL APPARATUS

[75] Inventors: Eisaku Hori; Kazutaka Sakonjyu, both of Yokohama, Japan

[73] Assignee: Jidosha Denki Kogyo Kabushiki Kaisha, Yokohama, Japan

[21] Appl. No.: 08/854,985

[22] Filed: May 13, 1997

[51] Int. Cl.$^6$ .................................................. B60K 31/04
[52] U.S. Cl. .......................... 701/93; 180/170; 123/350
[58] Field of Search ....................... 701/93, 94; 180/170; 123/349, 350

[56] References Cited

U.S. PATENT DOCUMENTS

| | | | |
|---|---|---|---|
| 4,598,370 | 7/1986 | Nakajima et al. | 364/426 |
| 4,723,213 | 2/1988 | Kawata et al. | 364/426 |
| 4,926,334 | 5/1990 | Suzuki et al. | 364/426.04 |
| 5,044,457 | 9/1991 | Aikman | 180/178 |
| 5,146,103 | 9/1992 | Utsumi et al. | 307/10.1 |
| 5,177,683 | 1/1993 | Oo et al. | 364/426.04 |
| 5,329,454 | 7/1994 | Takada et al. | 364/426.04 |

*Primary Examiner*—Michael J. Zanelli
*Attorney, Agent, or Firm*—Sughrue, Mion, Zinn, Macpeak & Seas, PLLC

[57] ABSTRACT

An automatic constant-speed cruising control apparatus for a vehicle comprises a vehicle speed sensor for sensing a present vehicle speed; a command switch group; a controller including a memory for storing an desired cruising speed, a calculator for generating an actuator drive signal in response to the difference between the desired cruising speed and the present vehicle speed, a cancel controller, a resume controller, a transition controller, integration means for integrating duration time of the actuator drive signal during constant acceleration control by the resume controller, and decision means for detecting the present vehicle speed to approach the desired cruising speed; and an actuator for driving a throttle valve according to the actuator drive signal. The transition controller drives drastically in the closing direction of the throttle valve for the time calculated depending on the integral time obtained by the integration means when the present vehicle speed approaches the desired cruising speed.

2 Claims, 3 Drawing Sheets

AUTOMATIC CONSTANT-SPEED CRUISING CONTROL APPARATUS

BACKGROUND OF THE INVENTION

1. Field of the Invention

The present invention relates to an automatic constant-speed cruising control apparatus used for automatically controlling a traveling speed of a vehicle to a certain preselected value.

2. Description of the Prior Art

As such an automatic constant-speed cruising control apparatus for controlling automatically a vehicle speed to a preselected value, an apparatus disclosed in Japanese Patent Application First publication (Kokai) No. sho 63-57341 has been known, for example.

In the automatic constant-speed cruising control apparatus of this kind, according to an off-operation after the on-operation of a set switch, a vehicle speed at the time of the off-operation is stored in a vehicle speed memory as a desired cruising speed. An actuator drive signal is transmitted to an actuator in response to the difference between an actual vehicle speed and the desired cruising speed stored in the vehicle speed memory, and the vehicle speed is controlled by driving a throttle valve of the vehicle through the actuator so as to coincide the actual vehicle speed with the stored desired cruising speed, consequently the vehicle travels automatically at the constant cruising speed.

When a cancell switch or a brake pedal is operated during the automatic constant-speed cruising, the constant-speed cruising of the vehicle is cancelled.

If a resume switch is operated in this state, resume control is started and the vehicle speed is resumed to the previous desired cruising speed stored in the vehicle speed memory by transmitting the drive signal to the actuator. The resume control is carried out by using acceleration constant K', acceleration $\alpha$ and difference $\epsilon$ ($\epsilon<0$) between the actual vehicle speed and the cruising speed stored in the vehicle speed memory, constant acceleration control is carried out under control output time ($T=\alpha-T\alpha$) which is a function of acceleration $\alpha$ of the vehicle and objective acceleration $T\alpha$ when decision means judges ($K'\cdot\alpha+\epsilon$) to be not larger than 0 (zero), and switching over is done from the constant acceleration control to constant speed control when the decision means judges ($K'\cdot\alpha+\epsilon$) to be larger than 0 (zero).

In another automatic constant-speed cruising control apparatus, resume control is also known, such that the constant acceleration control is carried out when the difference $\epsilon$ between the preselected desired cruising speed and the actual vehicle speed is larger than predetermined value A, and the constant acceleration control is switched over to the constant speed control at a point of time when the vehicle speed difference $\epsilon$ becomes not larger than the predetermined value A through the constant acceleration control.

In the aforementioned automatic constant-speed cruising control apparatus so designed as to change over the constant acceleration control to the constant speed control during the resume control by judging whether ($K'\cdot\alpha+\epsilon$) is larger than 0 or not, however, there is a fluctuation in the changeover time from the constant acceleration control to the constant speed control, whereby dispersion is sometimes produced in the time required for concentrating the actual vehicle speed to the stored desired cruising speed. Therefore, there is a problem since there is the possibility that overshooting of the vehicle speed occurs and deterioration is caused in the control characteristics.

In the other automatic constant-speed cruising control apparatus designed so as to change over the constant acceleration control to the constant speed control in the resume control by judging whether the vehicle speed difference $\epsilon$ is larger than the predetermined value A or not, it is necessary to carry out tuning in order to regulate the value A for every individual vehicle because it takes a prolonged time for concentrating the actual vehicle speed to the memorized desired cruising speed owing to overshoot or so in the vehicle excellent in the power performance unless the value A is changed between the vehicle excellent in the power performance and the vehicle not so. Accordingly, there is a problem in that an increase of man-power required for manufacturing the apparatus may be caused by the tuning of the value A.

SUMMARY OF THE INVENTION

This invention is made in view of the aforementioned problem of the prior art. It is an object to provide an automatic constant-speed cruising control apparatus which is possible to immediately restore the vehicle speed to the memorized desired cruising speed under excellent control characteristics at the time of the resume control.

The construction of the automatic constant-speed cruising control apparatus according to this invention for accomplishing the above mentioned object is characterized by comprising a vehicle speed sensor for sensing a present vehicle speed and generating actual speed data proportional to the present vehicle speed, set switch means operable for generating a cruise command signal to start constant-speed cruising control, resume switch means operable for generating a resume command signal, cancel means operable for generating a cancel command signal, memory means for storing actual speed data generated from the vehicle speed sensor as desired cruising speed data when the cruise command signal is generated by operating the set switch means, calculation means for comparing the actual speed data generated from the vehicle speed sensor and the desired cruising speed data stored in the memory means and generating an actuator drive signal in response to a difference between the actual speed data and the desired cruising speed data, actuator means for driving a throttle valve of the vehicle in opening and closing directions in response to the actuator drive signal generated from the calculation means, cancel control means for cutting off the actuator drive signal in response to the cancel command signal generated from the cancel means and cancelling the constant-speed cruising control until the resume command signal is generated from the resume switch means, resume control means for controlling a vehicle speed so as to restore the vehicle speed to an desired cruising speed corresponding to the desired cruising speed data stored in the memory means when the resume command signal is generated by operating the resume switch means, and control means for controlling the actuator so as to drastically drive the throttle valve in the closing direction before switching over from constant acceleration control by the resume control means to constant-speed cruising control.

The automatic constant-speed cruising control apparatus according to another embodiment of this invention is characterized in that the apparatus further comprises integration means for integrating duration time of the actuator drive signal during the constant acceleration control by the resume control means and decision means for decideing whether or not the difference between the actual speed data and the desired cruising speed data is within a predetermined value, and the transition control means calculates transition driving time required for driving the actuator in the closing direction of the throttle valve in accordance with the total duration time obtained by the integration means and controls the actuator by generating a transition drive signal for the calculated transition driving time when the difference between the actual speed data and the desired cruising speed data is decided to be within the predetermined value by the decision means.

The automatic constant-speed cruising control apparatus according to the other preferred embodiment of this invention is characterized in that the actuator is provided with a negative pressure chamber, an output member movable according to a negative pressure level in the negative pressure chamber and connected to the throttle valve of the vehicle, a vacuum valve communicating with the negative pressure chamber at one side thereof and communicating with a negative pressure source at another side thereof, a vent valve communicating with the negative pressure chamber at one side thereof and opened to the atmosphere at another side thereof, and a safety valve communicating with the negative pressure chamber at one side thereof and opened to the atmosphere at another side thereof, the integration means calculates the total duration time by adding the amount of time the vacuum valve is opened every time the vacuum valve is opened and subtracting the amount of time the vent valve is opened from the total duration time every time the vent valve is opened during the constant acceleration control by the resume control means, and the transition control means generates the transition drive signal including a vacuum closing signal to close the vacuum valve of the actuator, a vent valve opening signal to close the vacuum valve of the actuator, a vent valve opening signal to open the vent valve of the actuator and a safety valve opening signal to open the safety valve of the actuator in accordance with the total duration time obtained by the integration means.

In the automatic constant-speed cruising control apparatus according to this invention, the resume control means works on basis of an operation of the resume switch means after the vehicle speed is reduced according to the cancelling operation of the cancel means, and executes the resume control in order to restore the vehicle speed to the desired cruising speed at the time of cancelling the previous constant speed cruising. The throttle valve of the vehicle is drastically driven in the decelerating direction through the actuator by the transition control means immediately before the resume control means finishes to work, whereby the throttle valve speedily returns to the opening angle sufficient to maintain the vehicle speed at the desired cruising speed stored in the memory means as desired cruising speed data. Therefore, the vehicle speed is immediately restored to the desired cruising speed without overshooting or so, as compared with the conventional cruising apparatus designed so as to change over from the constant acceleration control during the resume control to the constant speed control at the same time of termination of the constant acceleration control.

In the automatic constant-speed cruising control apparatus according to another embodiment of this invention, the resume control means works on basis of the operation of the resume switch means after the vehicle speed is reduced according to the cancelling operation of the cancel means, and executes the resume control in order to restore the vehicle speed to the desired cruising speed at the time of cancelling the constant speed cruising. According to the working of the resume control means, the opening angle of the throttle valve during the resume control is recognized by integrating duration time of the actuator drive signal through the integration means, the decision is done by the decision means as to whether or not the difference between the desired cruising speed and the present vehicle speed is within the predetermined reference value by comparing the desired cruising speed data stored in the memory means and the actual speed data generated from the vehicle speed sensor, and the termination of the resume control is recognized by the decision that the vehicle speed difference is within the predetermined reference value. The time required for returning the throttle valve in the closing direction is calculated by subtracting the opening angle of the throttle valve to maintain the vehicle speed at the desired cruising speed from the recognized present opening angle of the throttle valve, and the transition control means drives the actuator drastically in the closing direction of the throttle valve for the calculated time. Therefore the throttle valve returns to the opening angle suitable to maintain the vehicle speed at the desired cruising speed with accuracy without causing the overshooting of the vehicle speed or so, since the constant speed cruising control is not started at the same time of the termination of the constant acceleration control during the resume control.

In the automatic constant-speed cruising control apparatus according to the other embodiment of this invention, the resume control means works by operating the resume switch means after the vehicle speed is lowered on basis of the cancelling operation and performs the control for restoring the vehicle speed to the desired cruising speed at the time of cancelling the previous constant speed cruising. According to the working of the resume control means, the opening angle of the throttle valve during the resume control is recognized by the total duration time of the vacuum valve opening signal and the total duration time of the vent valve opening signal calculated by the integration means, and the decision is done by the decision means as to whether or not the difference between the desired cruising speed and the present vehicle speed is within the predetermined reference value by comparing the desired cruising speed data stored in the memory means and the actual speed data generated from the vehicle speed sensor. The termination of the resume control is recognized according to the decision that the vehicle speed difference is within the reference value. The transition control means calculates time for returning the throttle valve in the closing direction through the actuator by subtracting the opening angle of the throttle valve to maintain the vehicle speed at the desired cruising speed from the recognized present opening angle of the throttle valve, and generates the transition drive signal including the vacuum valve closing signal, the vent valve opening signal and the safety valve opening signal for the calculated time, whereby the throttle valve returns to the opening angle suitable to maintain the vehicle speed at the desired cruising speed with accuracy. Therefore, the constant speed cruising control is not started at the same time of the termination of the constant acceleration control in the resume control and the throttle valve returns to the opening angle to maintain the vehicle speed at the desired cruising speed without causing the overshoot of the vehicle speed or so.

DESCRIPTION OF THE PREFERRED EMBODIMENT

An embodiment of the automatic constant-speed cruising control apparatus according to this invention will be explained below with reference to FIG. 1 to FIG. 3.

Figure 1:
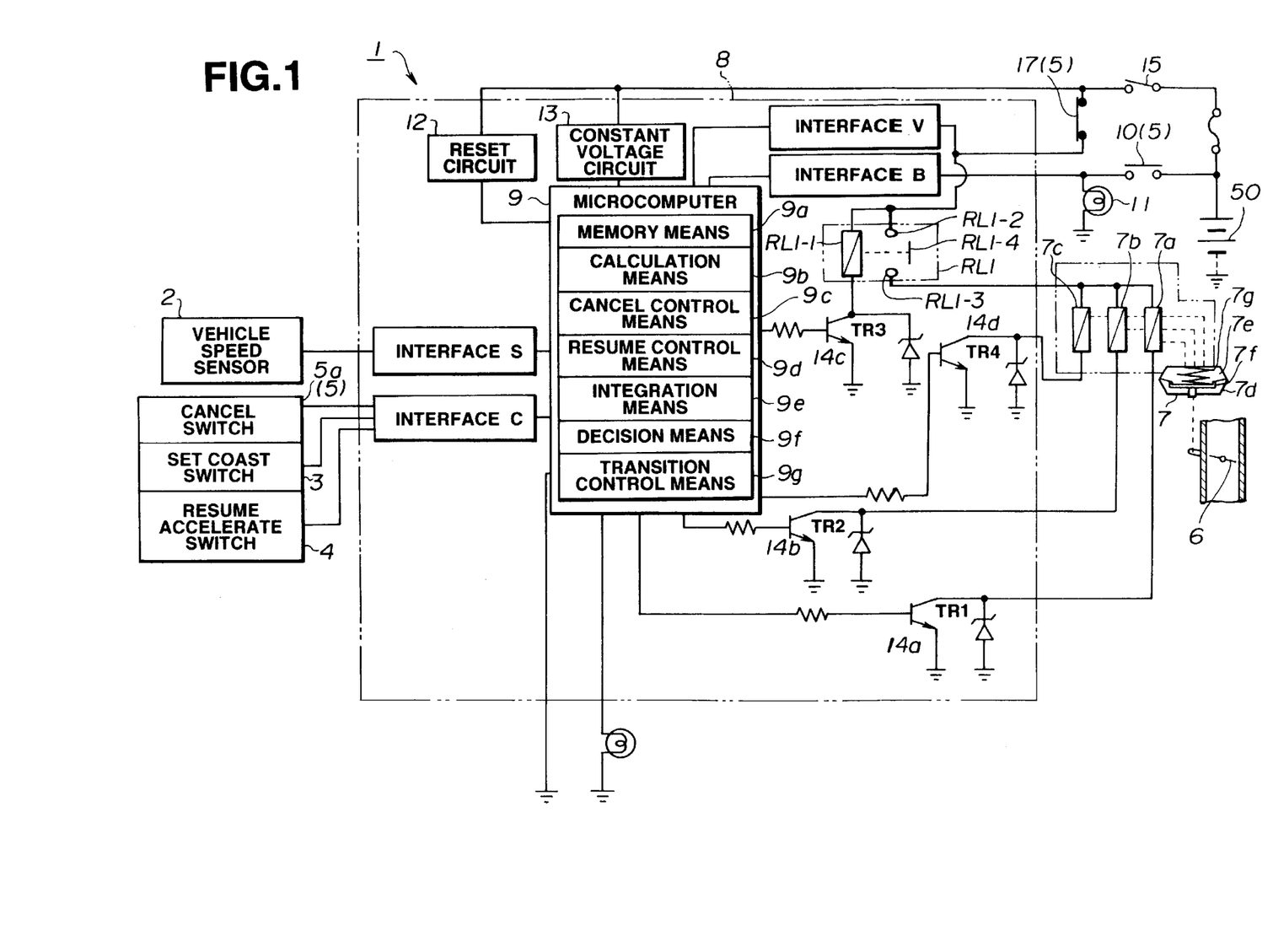
FIG. 1 is a circuit diagram of an embodiment of the automatic constant-speed cruising control apparatus according to this invention.

The automatic constant-speed cruising control apparatus 1 shown in FIG. 1 is composed mainly of a vehicle speed sensor 2, a set coast switch (set switch) 3, a resume accelerate switch (resume switch) 4, a cancel means 5 including a cancel switch 5a, a brake switch 10, an actuator power switch 17 and so on, an actuator 7 provided with a vent valve 7a, a vacuum valve 7b and a safety valve 7c, a throttle valve 6 connected to the output side of the actuator 7 and a control means 8 for controlling the actuator 7 by processing the respective signals generated by the vehicle speed sensor 2, the set switch 3, the resume switch 4 and the cancel means 5. The control means 8 is provided with a microcomputer 9 housed with a memory means 9a, a calculation means 9b, a cancel control means 9c, a resume control means 9d, an integration means 9e, a decision means 9f and a heavy deceleration control means 9g.

The vehicle speed sensor 2 is housed in a speedometer and generates actual speed data with pulse signals proportional to the present vehicle speed while the vehicle is traveling. The actual speed data are transferred to the microcomputer 9 in the control means 8 through an interface S from the vehicle speed sensor 2.

The set coast switch 3, the resume accelerate switch 4 and the cancel switch 5a (cancel means 5) are auto-returnable type switches disposed on a steering wheel and are so designed as to be switched on according to an operation by the driver.

When the vehicle is traveling and a main switch 15 is switched on, the set coast switch 3 generates a cruise command signal according to on and off-operations thereof in a state where the constant-speed cruising control is cancelled. The generated cruise command signal is transformed through an interface C provided in the control means 8 and transferred to the microcomputer 9. In response to the cruise command signal, the actual speed data from the vehicle speed sensor 2 are stored in the memory means 9a as an desired cruising speed data.

Further, when the set coast switch 3 is switched off after the on-operation for a period of time longer than a predetermined time by the driver under the constant-speed cruising control, a coast command signal is generated corresponding to the amount of time the set coast switch 3 is kept in the on-operation for decreasing the vehicle speed and renewing the desired cruising speed data stored in the memory means 9a, and when the set coast switch 3 is switched on and off repeatedly in a short period of time by the driver under the constant-speed cruising control, a tap-down command signal is generated for subtracting a predetermined value from the actual speed data or the desired cruising speed data and renewing the cruising speed data stored in the memory means 9a. The generated coast command signal and the tap-down command signal are transformed through the interface C in the control means 8 and transferred to the microcomputer 9.

When the resume accelerate switch 4 is switched off after the on-operation for a period of time longer than a predetermined time by the driver under the constant-speed cruising control, an acceleration command signal is generated corresponding to the amount of time the resume accelerate switch 4 is kept in the on-operation for increasing the vehicle speed and renewing the desired cruising speed data stored in the memory means 9a, and when the resume accelerate switch 4 is switched on and off repeatedly in the short period of time by the driver under the constant-cruising control, a tap-up command signal is generated for adding a predetermined value to the actual speed data or the cruising speed data and renewing the desired cruising speed data stored in the memory means 9a. Furthermore, when the resume accelerate switch 4 is switched on by the driver while the constant-speed cruising control is cancelled, a resume command signal is generated for restoring the vehicle into the constant-speed cruising control state before cancelling the previous constant-speed cruising control. The generated acceleration command signal, the tap-up command signal and the resume command signal are transformed through the interface C in the control means 8 and transferred to the microcomputer 9.

The cancel switch 5a (cancel means 5) generates a cancel command signal according to an on-operation by the driver under the constant-speed cruising control. The cancel command signal generated from the cancel switch 5a are transformed through the interface C in the control means 8 and transferred to the microcomputer 9. The cancel command signal is also generated when the brake switch 10 (cancel means 5) is switched on by operating the brake pedal (not shown) and the actuator power switch 17 (cancel means 5) is switched off, the actuator power switch 17 is switched off by shifting the automatic transmission (not shown) from the neutral range to the parking range, the vehicle speed is extremely lowered, or the clutch pedal of the manual transmission (not shown) is operated. When the brake switch 10 is switched on, a brake lamp 11 lights and the cancel command signal generated from the brake switch 10 is transformed through an interface B and transferred to the microcomputer 9. When the actuator power switch 17 is switched off, power supply is interrupted to the actuator 7 and the generated cancel command signal is transformed through an interface V and transferred to the microcomputer 9.

The actuator 7 is provided with a negative pressure chamber 7e formed in a case 7d, and output member 7f connected to the throttle valve 6 of the vehicle and movable according to intensity of negative pressure in the negative pressure chamber 7e, a vent valve 7a, a vacuum valve 7b and a safety valve 7c. The respective valves 7a, 7b and 7c communicate with the negative pressure chamber 7e on one side thereof.

When a negative pressure level (vacuum level) in the negative pressure chamber 7e of the actuator 7 becomes higher, the output member 7f moves so as to reduce volume of the negative pressure chamber 7e and the throttle valve 6 is driven in the opening direction against elasticity of a return spring 7g. On the other hand, if the negative pressure level in the negative pressure chamber 7e becomes lower, the output member 7f of the actuator 7 returns so as to increase the volume of he negative pressure chamber 7e according to the elasticity of the return spring 7g and the throttle valve 6 is forced to be driven in the closing direction.

The vent valve 7a and the safety valve 7c of the actuator 7 are opened to the atmosphere on the other side, respectively. Therefore, the negative pressure chamber 7e is isolated from the external atmosphere if the valves 7a and 7c are closed by switching on feeder circuits to solenoids disposed to the respective valves 7a and 7c, and the output member 7f returns in the closing direction of the throttle valve 6 by introducing the atmosphere into the negative pressure chamber 7e when the valves 7a and 7c are opened by switching off the feeding circuits to the solenoids of the respective valves 7a and 7c.

The vacuum valve 7b of the actuator communicates with an intake manifold (negative pressure generating source) of the engine on the other side. Therefore, the vacuum valve 7b has a function for introducing the negative pressure generated by the engine into the negative pressure chamber 7e from the intake manifold for a time as long as the amount of time the valve 7b is opened when the valve 7b is opened by switching on a feeding circuit to a solenoid disposed to the vacuum valve 7b while the engine words, and for isolating the negative pressure chamber 7e from the negative pressure in the intake manifold when the valve 7b is closed by switching off the feeding circuit to the solenoid. In a case where the vacuum valve 7b is replaced with a negative pressure generating motor, the negative pressure generating motor communicates with the negative pressure chamber 7e and has a function for introducing the negative pressure generated by the motor into the negative pressure chamber 7e.

The actuator 7 drives the throttle valve 6 in the opening direction (acceleration) through the output member 7f when the negative pressure level becomes high by closing the vent valve 7a and the safety valve 7c and opening the vacuum valve 7b by making the respective valves 7a, 7b and 7c into ON-states, and the actuator 7, contrary to this, drives the throttle valve 6 in the closing direction (deceleration) through the output member 7f when the negative pressure level becomes lower by opening the safety valve 7c or the vent valve 7a and closing the vacuum valve 7b by making the valves 7a, 7b and 7c into OFF-states, respectively.

On the other side, the control means 8 is provided with the microcomputer 9, the interfaces S, C, B and V, a reset circuit 12, a constant voltage circuit 13, a relay RL1, a vent valve switching section 14a, a vacuum valve switching section 14b, an actuator power switching section 14c and a safety valve switching section 14d.

The constant voltage circuit 13 is connected to a power source 50 or one side through a main switch 15 and connected to the microcomputer 9 on the other side, sot that set voltage by the constant voltage circuit 13 is impressed to the microcomputer 9 by switching on the main switch 15. The reset circuit 12 has a function for reseting the microcomputer 9 into an initial state at the time of switching on the main switch 15.

One end of a relay coil RL1-1 of the relay RL1 is connected to one end of the main switch 15 through a normal opened-fixed contact RL1-2, and the other end of the relay coil RL1-1 is connected to the collector of a transistor TR3 in the actuator power switching section 14c. Another normal opened-fixed contact RL1-3 of the relay RL1 is connected to ends of solenoid coils of the vent valve 7a, the vacuum valve 7b and the safety valve 7c of the actuator 7, respectively.

When an actuator drive signal is supplied to the transistor TR3 of the actuator power switching section 14c from the microcomputer 9, a feeder circuit to the relay coil RL1-1 of the relay RL1 is formed and the relay coil RL1-1 is excited, whereby the voltage of the power source 50 is applied on ends of the solenoid coils disposed on the safety valve 7c, the vent valve 7a and the vacuum valve 7b, respectively.

While the transistor TR3 of the actuator power switching section 14c is kept in the ON-state, the vacuum valve 7b is switched on (opened) if a vacuum valve opening signal which is one of the actuator drive signal is supplied to a transistor TR2 provided in the vacuum valve switching section 14b from the microcomputer 9, the vent valve 7a is switched on (closed) if a vent valve closing signal which is one of the actuator drive signal is supplied to a transistor TR1 provided in the vent valve switching section 14a from the microcomputer 9, and the safety valve 7c is switched on (closed) if a safety valve closing signal which is one of the actuator drive signal is supplied to a transistor TR4 provided in the safety valve switching section 14d from the microcomputer 9.

In the control means 8, the transistor TR3 in the actuator power switching section 14c is made the ON-state by switching on the set coast switch 3 according to the driver's operation while the constant-speed cruising control is cancelled when the vehicle is traveling and the main switch 15 is switched on. When the cruise command signal is generated by switching off the set coast switch 3, the actual speed data generated from the vehicle speed sensor 2 at the time of the off-operation are stored in the memory means 9a as the desired cruising speed data. At the same time, a speed-up control means (not shown) housed in the microcomputer 9 is actuated in response to a set initialize signal for the constant-speed cruising control, and the transistor TR1 in the vent valve switching section 14a, the transistor TR4 in the safety valve switching section 14d and the transistor TR2 in the vacuum valve switching section 14b are made into ON-states according to the actuator drive signal for speed-up including the vent valve closing signal, the safety valve closing signal and the vacuum valve opening signal generated by actuating the speed-up control means with the set initialize signal. Whereby, the vent valve 7a and the safety valve 7c are closed and the vacuum valve 7b is opened, the negative pressure level in the negative pressure chamber 7e of the actuator 7 becomes higher and the throttle valve 6 is driven in the opening direction according to the set initialize signal through the output member 7f. Subsequently, the constant-speed cruising control is started after the set initialization is completed by making the transistor TR2 in the vacuum valve switching section 14b into the OFF-state, and the actual speed data generated from the vehicle speed sensor 2 is controlled so as to coincide with the desired cruising speed data stored in the memory means 9a.

The control means 8 performs calculation by the calculation means 9b in the microcomputer 9 according to a predetermined formula using a difference obtained by comparing the actual speed data generated by the vehicle speed sensor 2 with the desired cruising speed data stored in the memory means 9a at the time of generation of the cruise command signal, and acceleration obtained from a change rate of the actual speed data within a defined period of time. If the calculation result is negative valve, the control means 8 judges the vehicle speed to be lowered and actuates a speed-up control means (not shown) in the microcomputer 9 for a time corresponding to the calculation result, thereby generating the actuator drive signal for speed-up including the vent valve closing signal, the safety valve closing signal and the vacuum valve opening signal. Consequently, the negative pressure level in the negative pressure chamber 7e of the actuator 7 becomes higher and the constant-speed cruising control is executed so as to coincide the actual speed data generated by the vehicle speed sensor 2 with the desired cruising speed data stored in the memory means 9a by driving the throttle valve 6 in the opening direction.

When the calculation result obtained in the same manner is positive value, the control means 8 judges the vehicle speed to be increased and actuates a speed-down control means (not shown) in the microcomputer 9 for a time corresponding to the calculation result, thereby generating the actuator drive signal for speed-down including the vent valve opening signal, the safety valve closing signal and the vacuum valve closing signal. Therefore, the throttle valve 6 is driven in the closing direction by lowering the negative pressure level in the negative pressure chamber 7e of the actuator 7, and the constant-speed cruising control is carried out so as to coincide the actual speed data generated by the vehicle speed sensor 2 with the desired cruising speed data stored in the memory means 9a.

Figure 2:
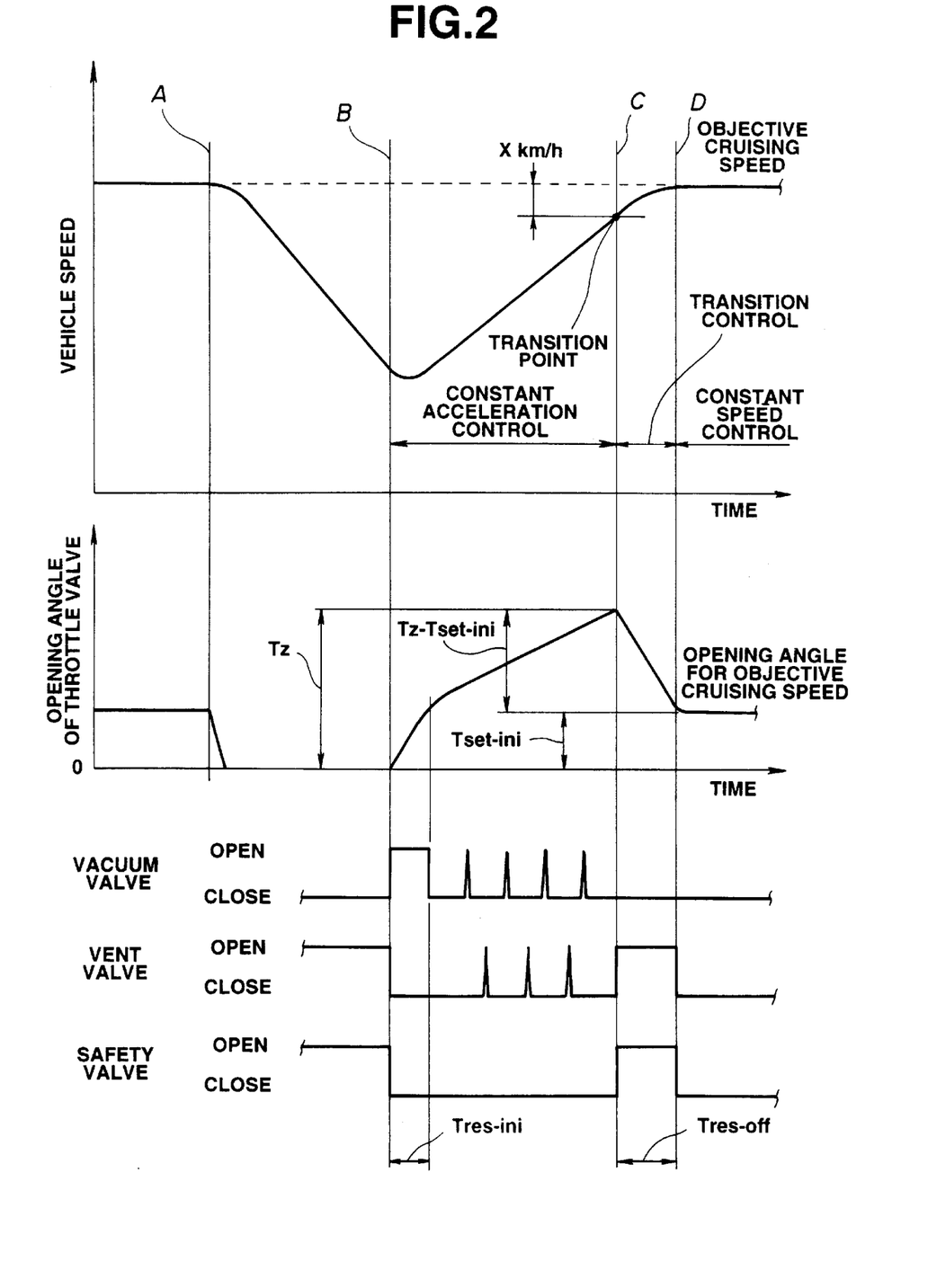
FIG. 2 is a time chart showing the relationship among conditions of valves in the actuator, opening angle of the throttle valve and vehicle speed in the automatic constant-speed cruising control apparatus shown in FIG. 1.

If the cancel switch 5 is switched on by the driver, the brake pedal is operated, the actuator power switch 17 is switched off, the automatic transmission is shifted from the neutral range to the parking range, the vehicle speed is reduced extremely, or the clutch pedal of the manual transmission is operated during the constant-speed cruising control, the cancel command signal is generated (at the time A shown is FIG. 2). The cancel command signal is transformed through the interface V in the control means 8 and transferred to the microcomputer 9, and the cancel control means 9c in the microcomputer 9 is actuated, whereby the control means 8 discontinues the constant speed cruising of the vehicle by cutting off the actuator drive signal and cancels the constant-speed cruising control without eliminating the desired cruising speed data stored in the memory means 9a.

The resume control means 9d housed in the microcomputer 9 of the control means 8 is actuated according to the transfer of resume command signal by the on-operation of the resume accelerate switch 4 (at the time B shown in FIG. 2) while the constant-speed cruising control is cancelled. The resume control means 9d executes constant-acceleration control by the predetermined acceleration until the vehicle speed approaches the desired cruising speed corresponding to the desired cruising speed data stored in the memory means 9a.

In resume initialize control by the resume control means 9d, outputting time $T_{res-ini}$ of a resume initialize signal is calculated using a vehicle speed function f(v) which is proportional to the present vehicle speed, and the resume control means 9d generate the resume initialize signal for the obtained outputting time $T_{res-ini}$. The obtained outputting time $T_{res-ini}$ of the resume initialize signal is memorized as an initial value of a integral time $T_z$.

In constant acceleration control by the resume control means 9d, an acceleration function f(α) is used. The resume control means 9d generates the vacuum valve opening signal and makes the integral time $T_z$ into $(T_z+T_{const-acc})$ if the acceleration value of the vehicle does not reach the objective value, and generates the vent valve opening signal and makes the integral time $T_z$ into $(T_z-T_{const-acc})$ when the acceleration value of the vehicle reaches the objective value.

The integration means 9e housed in the microcomputer 9 of the control means 8 calculates the integral time $T_z$ by subtracting an integral value (Σvent) obtained by integrating the outputting time of the opening signal to the vent valve 7a (vent valve opening signal) from an integral value (Σvac) obtained by integrating the outputting time of the opening signal to the vacuum valve 7b (vacuum valve opening signal), that is total duration time of the vacuum valve opening signal. Namely, the integral time $T_z$ is renewed by adding $T_{const-acc}$ to the integral time $T_z$ each time the vacuum valve opening signal is generated ($T_z=T_z+T_{const-acc}$) and subtracting $T_{const-acc}$ from the integral time $T_z$ each time the vent valve opening signal is generated ($T_z=T_z-T_{const-}$ $_{acc}$), and used for recognizing the actual opening angle of the throttle valve 6 during the constant acceleration control after the beginning of the resume control.

The decision means 9f housed in the microcomputer 9 of the control means 8 compares the present vehicle speed and the desired cruising speed by comparing the actual speed data generated from the vehicle speed sensor 2 with the desired cruising speed data stored in the memory means 9a during the resume control by the resume control means 9d, judges the present vehicle speed to be near the cruising speed and generates a decision signal (at the time C shown in FIG. 2) when the difference between the present vehicle speed and the desired cruising speed becomes not larger than the predetermined value (desired cruising speed-present vehicle speed ≦X Km/h). The transition control means 9g is actuated when the decision signal is generated from the decision means 9f, and the control means 8 calculates the time $T_{const-acc}$ required for the constant acceleration control using the acceleration function f(α) and executes the constant acceleration control for the calculated time until the decision signal is generated.

The transition control means 9g housed in the microcomputer 9 of the control means 8 calculates transition driving time $T_{res-off}$ by multiplying the value $(T_z-T_{set-ini})$ which is obtained by subtracting time $T_{set-ini}$ corresponding to the opening angle of the throttle valve 6 sufficient to maintain the vehicle speed at the desired cruising speed from the integral time $T_z$ corresponding to the present opening angle of the throttle valve 6 (see FIG. 2) by a predetermined constant W when the decision signal is generated from the decision means 9f. The transition control means 9g generates a transition drive signal including the vacuum valve closing signal, the vent valve opening signal and the safety valve opening signal in order to drive the throttle valve 6 drastically in the decelerating (closing) direction through the actuator 7 for a time as long as the calculated time $T_{res-off}$, thereby performing the transition control.

In this time, the vehicle speed is restored to the desired cruising speed without the overshooting nor undershooting since the transition driving time $T_{res-off}$ is calculated in accordance with the value obtained by subtracting $T_{set-ini}$ corresponding to the opening angle of the throttle valve 6 sufficient to maintain the vehicle speed at the desired cruising speed from the integral time $T_z$ corresponding to the present opening angle of the throttle valve 6, and throttle valve 6 returns immediately to the opening angle suitable to maintain the vehicle speed at the cruising speed without excess nor deficiency.

After the transition control means 9g complete the generation of the drastic driving signals, the constant-speed cruising control is restarted.

Figure 3:
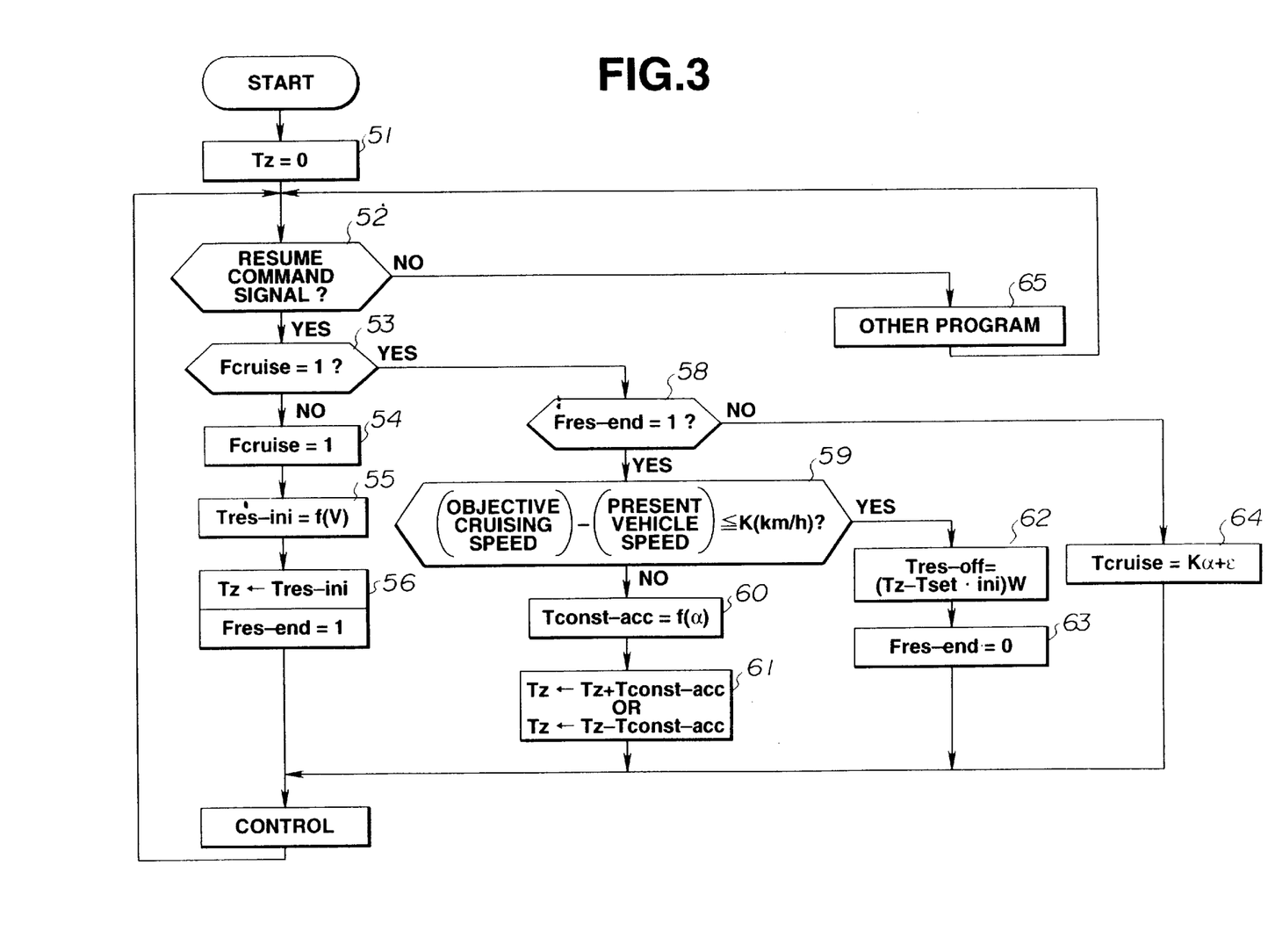
FIG. 3 is a flowchart illustrating the control in the automatic constant-speed cruising control apparatus shown in FIG. 1.

In the automatic constant-speed cruising control apparatus 1 having the aforementioned structure, the control is executed on basis of the time chart shown in FIG. 2 and the flowchart shown in FIG. 3. In the flowchart shown in FIG. 3, an explanation is mainly done about the resume control.

When the set coast switch 3 is switched on while the constant-speed cruising control is cancelled and the vehicle is traveling at the speed desired by the driver, the actuator power switching section 14c is made into the ON-state. The memory means 9a of the control means 8 memorizes the actual speed data generated from the vehicle speed sensor 2 as the desired cruising speed data in response to the off-operation of the set coast switch 3. The control means 8 actuates the speed-up control means by the set initialize signal corresponding to the actual speed data generated by the vehicle speed sensor 2 and actuates the actuator 7 by the actuator drive signal including the vent valve closing signal, the safety valve closing signal and the vacuum valve opening signal, thereby driving the throttle valve 6 in the opening direction. After the set initialization, the predetermined calculation is done by the calculation means 9b using the difference between the desired cruising speed data stored in the memory means and the actual speed data generated always from the vehicle speed sensor 2, and the acceleration obtained from the change rate of the actual speed data within the defined period of time, The constant-speed cruising control is carried out in order to coincide the vehicle speed with the desired cruising speed corresponding to the desired cruising speed data by actuating the actuator 7 with the actuator drive signal for speed-up including the vent valve closing signal, the safety valve closing signal and the vacuum valve opening signal from the speed-up control means when the calculation result is negative value, and by actuating the actuator 7 with the actuator drive signal for speed-down including the vent valve opening signal, the safety valve closing signal and the vacuum valve closing signal from the speed-down control means when the calculation result is positive value.

When cancel command signal is generated in response to the cancelling operation of the cancel means 5 at the time A shown in FIG. 2 during the constant-speed cruising control, the cancel control means 9c cancels the constant-speed cruising control without eliminating the desired cruising speed data stored in the memory means 9a by cutting off the actuator drive signal.

The actuator 7 discontinues to drive the throttle valve 6 according to the interruption of the actuator drive signal, and the vehicle speed is lowered.

If the resume command signal is generate in response to the on-operation of the resume accelerate switch 4 at the time B shown in FIG. 2, the resume control means 9d in the microcomputer 9 is actuated and the resume control is executed as shown is FIG. 3.

The resume control is started, the integral time $T_z$ is reset at step 51 and decision is done at step 52 as to whether the resume command signal is generated or not. In a case the resume command signal is not generated (NO), the other program is carried out at step 65, and control returns to step 52. If the resume command signal is generated (YES), decision is done as to whether a cruise flag $F_{cruise}$ is set or not at step 53.

In case where the cruise flag $F_{cruise}$ is not yet set, the cruise flag $F_{cruise}$ is set at step 54, the outputting time $T_{res-ini}$ of the resume initialize signal is calculated by using the vehicle speed function f(V) by the resume control means 9d at step 55, and the calculation result of the resume initialize outputting time $T_{res-ini}$ is stored in the integral time $T_z$ and a resume end flag $F_{res-end}$ is set at step 58. The resume control means 9d generates the resume initialize signal including the vacuum valve opening signal, the vent valve closing signal and the safety valve closing signal for the calculated outputting time $T_{res-ini}$ at step 57.

In a case where the cruise flag $F_{cruise}$ is set and the resume initialize signal has been generated, decision is done at step 58 as to whether the resume end flag $F_{res-end}$ is set or not after decision is done to be "YES" at step 53. The decision is done to be "YES" at step 58 since the resume end flag $F_{res-end}$ has been set at step 56, and decision is done at step 59 as to whether the difference between the desired cruising seed and the present vehicle speed is within the predetermined reference valve X (km/h) or not.

The decision is done to be "NO" at step 59 before the difference between the desired cruising speed and the present vehicle speed becomes smaller than the reference value X (km/h), that is before the present vehicle speed approaches the desired cruising speed to some degree, therefore control proceeds to steps 60 and 61. The control means 8 calculates the time $T_{const-acc}$ required for the constant acceleration control using the acceleration function f(α) at step 60, and executes the constant acceleration control by outputting the actuator drive signal including the vacuum valve opening signal and the vent valve opening signal for the calculated time $T_{const-acc}$. Furthermore, the integral time $T_z$ is renewed by adding $T_{const-acc}$ to the integral time $T_z$ every time the vacuum valve opening signal is generated and by subtracting $T_{const-acc}$ from the integral time $T_z$ every time the vent valve opening signal is generated at step 61.

When the present vehicle speed approaches the desired cruising speed and the difference between the desired cruising speed and the present vehicle speed becomes not larger than the predetermined reference value X (km/h) at the time C shown in FIG. 2, decision is done to be "YES" at step 59 and control proceeds to step 62. The transition control means 9g calculates the transition driving time $T_{res-off}$ by multiplying the value ($T_z - T_{set-ini}$) which is obtained by subtracting the time $T_{set-ini}$ corresponding to the opening angle of the throttle valve 6 possible to maintain the vehicle speed at the desired cruising speed from the integral time $T_z$ corresponding the present opening angle of the throttle valve 6 by the predetermined function f(W) at step 62, and generates the transition drive signal including the vacuum valve closing signal, the vent valve opening signal and the safety valve opening signal in order to drastically drive the throttle valve 6 in the closing direction for the calculated time $T_{res-off}$, thereby performing the transition control. Control proceeds to step 63 and the resume end flag $F_{res-end}$ is reset at step 63.

Subsequently, decision is done to be "NO" at step 58 since the resume end flag $F_{res-end}$ has been reset at step 63, control proceeds to step 64 and time $T_{cruise}$ for generating the actuator drive signal is calculated using the acceleration α, the vehicle speed difference ε and constant K for the constant-speed cruising control at step 64. Namely, the constant-speed cruising control is restarted at the time D shown in FIG. 2.

In the control means 8 as mentioned above, the resume control means 9d words by operating the resume accelerate switch 4 after the vehicle speed is reduced according to the cancelling operation and performs the control for restoring the vehicle speed to the desired cruising speed at the time of cancelling the previous constant speed cruising. According to the wording of the resume control means 9d, the opening angle of the throttle valve 6 during the resume control is recognized by the total duration time of the vacuum valve opening signal and the total duration time of the vent valve opening signal obtained by the integration means 9e and the decision is done as to whether or not the difference between the desired cruising speed and the present vehicle speed is within the predetermined reference value by the decision means 9f. The termination of the resume control is recognized according to the decision that the difference between the desired cruising speed and the present vehicle speed is within the predetermined reference value. The transition control means 9g calculates time for returning the throttle valve 6 in the closing direction by subtracting the opening angle of the throttle valve 6 to maintain the vehicle speed at the desired cruising speed from the present opening angle of the throttle valve recognized by the integration means 9e, and generates the vacuum valve closing signal, the vent valve opening signal and the safety valve opening signal, which are the transition drive signal for the calculated time, whereby the opening angle of the throttle valve 6 is returned to the opening angle sufficient to maintain the vehicle speed at the desired cruising speed without troubles such as overshooting of the vehicle speed or so.

As explained above, in the automatic constant-speed cruising control apparatus according to this invention, the resume control means is actuated by operating the resume switch means after the vehicle speed is lowered by the cancelling operation, the control is performed in order to restore the vehicle speed to the desired cruising speed at the time of cancelling the previous constant speed cruising. In this case, the opening angle of the throttle valve is coincided with the opening angle suitable for maintaining the vehicle speed at the desired cruising speed by drastically driving the throttle valve in the closing direction through the actuator by the transition control means immediately before the termination of the resume control without switching over from the constant acceleration control to the constant speed control at the same time of termination of the constant acceleration control during the resume control, therefore it is possible speedily and smoothly without overshooting of the vehicle speed or so.

In the automatic constant-speed cruising control apparatus according to another embodiment of this invention, the resume control means is actuated by operating the resume switch means after the vehicle speed is lowered on basis of the cancelling operation and performs the control for restoring the vehicle speed to the desired cruising speed at the time of cancelling the previous constant speed cruising. The opening angle of the throttle valve during the resume control is recognized by integrating duration time of the actuator drive signal through the integration means, the decision is done by the decision means as to whether the difference between the desired cruising speed and the present vehicle speed is within the predetermined reference value or not, and the termination of the resume control is recognized by deciding that the difference between the desired cruising speed and the present vehicle speed is within the reference value. The time required for returning the throttle valve in the closing direction is calculated by subtracting the opening angle of the throttle valve to maintain the vehicle speed at the desired cruising speed from the present opening angle of the throttle valve recognized from the integrated value by the integration means, and the transition control means drives the actuator drastically in the closing direction of the throttle valve for the calculated time. Therefore, the throttle valve returns to the opening angle suitable to maintain the vehicle speed at the desired cruising speed with accuracy, and it is possible to restore the vehicle speed to the desired cruising speed smoothly and immediately without overshooting of the vehicle speed or so.

In the automatic constant-speed cruising control apparatus according to the other embodiment of this invention, the resume control means is actuated by operating the resume switch means after the vehicle speed is lowered on basis of the cancelling operation and executes the control for restoring the vehicle speed to the desired cruising speed at the time of cancelling the previous constant speed cruising. According to the working of the resume control means, the opening angle of the throttle valve during the resume control is recognized by the total duration time of the vacuum valve opening signal and the total duration time of the vent valve opening signal calculated by the integration means and the decision is done by the decision means as to whether or not the difference between the desired cruising speed and the present vehicle speed is within the predetermined reference value. The termination of the resume control is recognized according to the decision that the difference between the desired cruising speed and the present vehicle speed is within the reference value. The transition control means calculates time for returning the throttle valve in the closing direction by subtracting the opening angle of the throttle valve to maintain the vehicle speed at the desired cruising speed from the recognized present opening angle of the throttle valve, and generates the transition drive signal including the vacuum valve closing signal, the vent valve opening signal and the safety valve opening signal for the calculated time, whereby the throttle valve is returned to the opening angle suitable to maintain the vehicle speed at the desired cruising speed with accuracy through the drastic driving of the actuator. Therefore, it is possible to restore the vehicle speed to the desired cruising speed smoothly and immediately without overshooting of the vehicle speed or so.

According to the automatic constant-speed cruising control apparatus of this invention, an excellent effect can be obtained in that it is possible to restore the vehicle speed to the memorized desired cruising speed immediately through the resume control under excellent control characteristics.

What is claimed is:

1. An automatic constant-speed cruising control apparatus for a vehicle comprising:

a vehicle speed sensor for sensing a present vehicle speed, and for generating actual speed data proportional to the present vehicle speed;

set switch means operable for generating a cruise command signal to start constant-speed cruising control;

resume switch means operable for generating a resume command signal;

memory means for storing actual speed data generated from said vehicle speed sensor as desired cruising speed data when the cruise command signal is generated by operating said set switch means;

calculation means for comparing the actual speed data generated from said vehicle speed data stored in said memory means, and for generating an actuator drive signal in response to a difference between said actual speed data and said desired cruising speed data;

actuator means for driving a throttle valve of the vehicle in opening and closing directions in response to the actuator drive signal generated from said calculation means;

cancel control means for cutting off said actuator drive signal in response to the cancel command signal generated from said cancel means, and for cancelling the constant-speed cruising control until the resume command signal is generated from said resume switch means;

resume control means for controlling a vehicle speed so as to restore the vehicle speed to a desired cruising speed corresonding to said desired cruising speed corresponding to said desired cruising speed data stored in the memory means when the resume command signal is generated by operating said resume switch means;

transition control means for controlling said actuator so as to drastically drive the throttle valve in the closing direction before switching over from constant acceleration control by the resume control means to constant-speed cruising control;

integration means for integrating duration time of said actuator drive signal during the constant acceleration control by the resume control means; and decision means for deciding whether or not the difference between said actual speed data and said desired cruising speed data is within a predetermined value; wherein said transition control means calculates transition driving time required from driving the actuator in the closing direction of the valve in accordance with the total duration time obtained by said integration means and controls the actuator by generating a transition drive signal for the calculated transition driving time when the difference between said actual speed data and said desired cruising speed data is decided to be within the predetermined value by said decision means.

2. An automatic constant-speed cruising control apparatus as set forth in claim 1, wherein said actuator is provided with a negative pressure chamber, an output member movable according to a negative pressure level in said negative pressure chamber and connected to the throttle valve of the vehicle, a vacuum valve communicating with the negative pressure chamber at one side thereof and communicating with a negative pressure source at another side thereof, a vent valve communicating with the negative pressure chamber at one side thereof and opened to the atmosphere at another side thereof, and a safety valve communicating with the negative pressure chamber at one side thereof and opened to the atmosphere at another side thereof;

said integration means calculates the total duration time by adding the amount of time the vacuum valve is opened every time the vacuum valve is opened and subtracting the amount of time the vent valve is opened from said total duration time every time the vent valve is opened during the constant acceleration control by the resume control means; and said transition control means generates the transition drive signal including a vacuum valve closing signal to close the vacuum valve of said actuator, a vent valve opening signal to open the vent valve of said actuator and a safety valve opening signal to open the safety valve of said actuator in accordance with the total duration time obtained by said integration means.

* * * * *